UNITED STATES PATENT OFFICE.

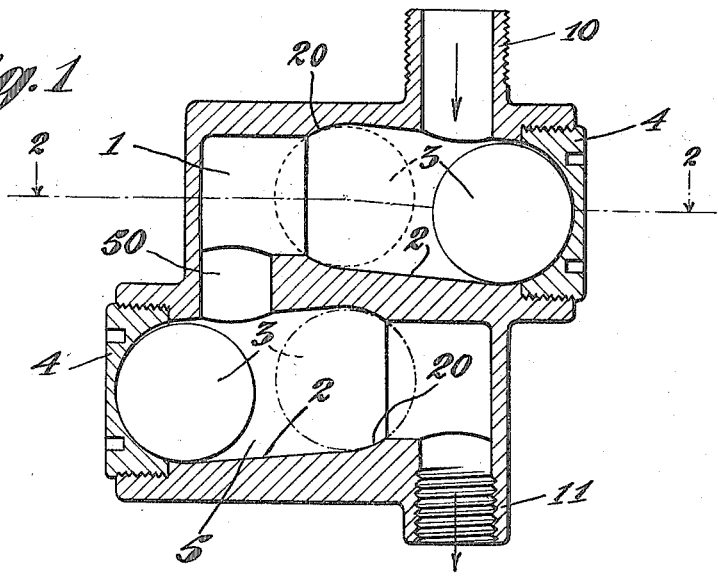
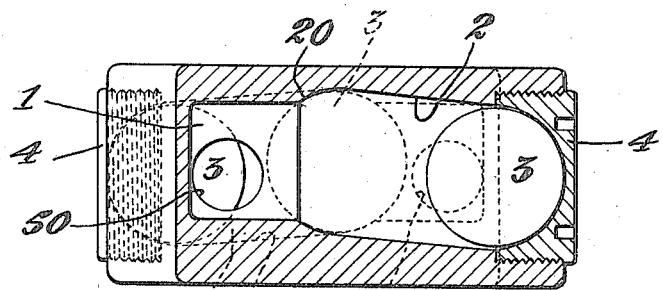
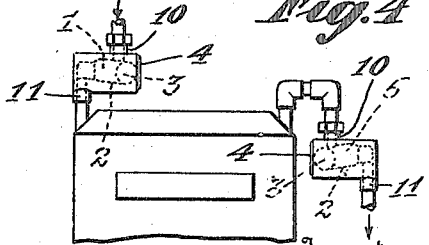
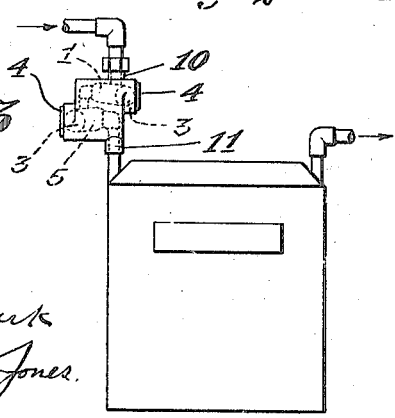

WILLIAM W. FLANDERS, OF EVERETT, WASHINGTON.

ATTACHMENT FOR GAS-METERS.

1,180,482. Specification of Letters Patent. Patented Apr. 25, 1916.

Application filed February 25, 1915. Serial No. 10,447.

*To all whom it may concern:*

Be it known that I, WILLIAM W. FLANDERS, a citizen of the United States, residing at Everett, in the county of Snohomish, State of Washington, have invented a new and useful Improvement in Attachments for Gas-Meters, of which the following is a specification.

My invention relates to an attachment for gas meters, having for its object to provide means for preventing the flow of gas through the valves of an ordinary meter without registration, as will sometimes happen when the meter is not in true vertical position.

The novel features of my invention will be particularly pointed out in the claims appended hereto.

In the accompanying drawings I have shown my invention as applied to a common meter, the construction being that which is now preferred by me.

Figure 1 is a section through the mechanism, of the type in which two controlling valves are combined in one body. Fig. 2 is a section taken through one of these valve bodies on the line 2—2 of Fig. 1. Fig. 3 is a view showing the device as applied to a meter. Fig. 4 is a similar view to Fig. 3 showing the two valves of the device as separated and applied, one to the inlet and the other to the outlet pipe of the meter.

Experience has shown that it is possible, in gas meters of a certain type, by slightly tipping the meter in one direction or the other, to loosen the contact of the valves with their seats, so that gas may pass without its being recorded by the meter. By my invention I provide an attachment, which is entirely separate from the ordinary mechanism of the meter, which will close the gas conducting channel if the meter is tilted sufficiently from the perpendicular position to cause loosening of the contact of the ordinary valves of the meter.

My device consists essentially of two ball race-ways which are placed in the gas conducting channels, each being associated with a valve seat in such manner that if the meter be tilted in the manner referred to, the ball, which is placed upon each race-way, will be rolled into contact with the valve seat and cut off the flow of gas until the meter is placed in perpendicular position.

In Fig. 1 I have shown a construction which is adapted for connection in the gas pipe and which contains both of these raceways. This device may be connected either in the supply or discharge pipe, at will. The nipple 10 is the one which should be connected to receive the supply of gas, while the nipple 11 is the one through which the gas is discharged. Within the chamber 1 is provided a race-way 2, at the discharge end of which a valve seat 20 is formed, which valve seat is adapted to receive a ball 3 which ball normally rests at the end of the race-way opposite the valve seat. The device should be so connected that the raceway is inclined toward the end opposite the seat. The inlet 10 is placed so that it will be beyond the ball from the seat when the ball is in place on the seat, and between the ball and the seat when the ball is at the opposite end of the race-way. One end of the race-way, as the one at which the ball normally rests, is shown as closed by the screwthreaded plug 4. A second chamber 5, is provided, which is connected with the chamber 1 by passage 50, this passage communicating with the space which is beyond the valve seat in the direction of the flow of gas. A race-way 2, valve seat 20 and ball 3 are provided for this chamber, these being all similar in construction and function to those described in connection with the other chamber. A closing plug 4 similar in construction to that described for the other chamber is also provided for this chamber.

It is evident that the two chambers 1 and 5, may be made in separate members, and that one of these may be connected in the supply pipe and the other in the discharge pipe of the meter as is shown in Fig. 4. It is also evident that where the two chambers are combined in one casing, this may be connected either in the supply pipe or the discharge pipe as desired.

It may be seen by referring to Fig. 1, that the two race-ways are oppositely inclined each to the other, and such that when the device is placed in a middle position, both balls will run to the end of the race-way which is opposite the valve seat. The amount of this inclination may be varied and, preferably, should be quite slight. The inclination as shown in the drawing is purposely made rather more than is necessary, to thereby better bring out this point.

Referring to Fig. 2, which is a section taken on a plane at right angles to that of Fig. 1, it will be seen that the two race-ways are also inclined, each to the other, in this figure. It is preferred that the race-ways be inclined in both of these respects in the same construction. When this is done, it is immaterial whether the device be connected in the pipe in the vertical or horizontal position as it will operate equally well in either position.

I claim as my invention—

1. An attachment for gas meters containing a ball race-way placed in an inclined position in the gas conducting channel and having a valve seat at its upper end, and a ball freely movable along said race-way and adapted to close the gas conducting channel when seated on the seat, the supply connection with said gas conducting channel being between the normal position of the ball and the valve seat.

2. An attachment for gas meters containing two ball race-ways placed in successive relation in the gas conducting channel, said race-ways being oppositely inclined and having a ball seat at the upper end of each, and a ball in each race-way adapted to close the passage when contacted with its seat, the supply connection with said gas conducting channel being between the normal position of the ball and the valve seat.

3. An attachment for gas meters containing two ball race-ways in the gas conducting channels, a movable ball-valve normally resting at one end and a valve seat at the opposite end of each race-way, each of said ball-valves being adapted to automatically engage its respective valve seat to close the conducting channel whenever the attachment is tilted in a direction to bring said valve seat to a lower level.

4. The combination with a gas meter of a controlling valve comprising a casing having a valve seat surrounding the outflow channel, a ball race-way leading from said seat, and a ball on said race-way adapted to automatically engage the seat to close the outflow passage when the meter is changed from a vertical position, said race-way normally having an inclination to cause the ball to roll away from the seat, and the casing having an inlet opening between the seat and the opposite end of the race-way.

WILLIAM W. FLANDERS.

Witnesses:
SCHUYLER DURYEE,
HARRY L. JONES.

Copies of this patent may be obtained for five cents each, by addressing the "Commissioner of Patents. Washington, D. C."